March 7, 1967          T. F. SARAH          3,307,798

DRAG OPERATING MECHANISM FOR FISHING REELS

Filed Nov. 23, 1964          2 Sheets-Sheet 1

INVENTOR.
THOMAS F. SARAH
BY *Hamilton & Cook*
ATTORNEYS

March 7, 1967    T. F. SARAH    3,307,798
DRAG OPERATING MECHANISM FOR FISHING REELS
Filed Nov. 23, 1964    2 Sheets-Sheet 2

INVENTOR.
THOMAS F. SARAH
BY *Hamilton & Cook*
ATTORNEYS

3,307,798
DRAG OPERATING MECHANISM FOR FISHING REELS

Thomas F. Sarah, Akron, Ohio, assignor to Pflueger Corporation, Akron, Ohio, a corporation of Ohio
Filed Nov. 23, 1964, Ser. No. 413,064
8 Claims. (Cl. 242—84.2)

The present invention relates generally to brake, or drag, mechanisms for fishing reels. More particularly, the present invention relates to mechanisms for adjusting the drag of a spinning type fishing reel. Specifically, the present invention relates to spinning type fishing reels, wherein the drag is located between the winding element, or flyer, and the shaft on which it is mounted, and the mechanism for adjusting the drag is located remotely of the flyer.

The spinning reel, in which the spool remains stationary while the line uncoils during casting, has achieved widespread acceptance, particularly because it eliminates backlash which so frequently occurs with the type of reel in which the spool rotates to pay out the line during the cast.

Moreover, the spinning reel has garnered even more advocates because it is as readily usable on a casting reel, fly rod or specialized spinning rod.

Spinning reels have a winding element, or flyer, fixed on a shaft so as to be rotatable therewith when the fisherman winds the reel crank. Coaxial with and radially inwardly of the flyer is the spool on which the line is wound.

The purpose of a brake, or drag, mechanism in such a fishing reel is to allow the line to pay out when the pull exerted by the fish overcomes the selective frictional resistance of the drag. The conventional drag mechanism comprises adjustable friction means located at one of several locations. Three locations have been most widely used in the spinning reel art, but each has its advantages and disadvantages.

In one location the drag mechanism is associated with the spool. With this construction the spool is normally nonrotatable so that the flyer, as it is rotated, will coil the line onto the spool. However, depending upon the setting of the drag member, the spool is permitted itself to rotate in a direction reversely of the flyer when the line tension is sufficiently strong. This construction is the least favored because rotation of the spool reversely of the winding member imparts a twist to the line.

A second form of drag mechanism comprises a selectively variable friction drive interposed between the crank handle and the drive gear. The amount of friction, or drag, is controlled by turning an adjusting knob, commonly in the form of a star wheel, on the exterior of the reel and coaxial of the shaft to which the crank is attached. By preselecting the amount of friction, the fisherman can provide that the line will strip off the spool when the pull of the fish would exceed the strength of the line, and, by manipulation of the star wheel after the fish is hooked, the fisherman can play the fish by allowing it to run or check the fish and retrieve the line. The primary attribute of this construction is that the adjusting knob is located in close proximity to the crank so that the fisherman has ready access thereto for controlling the amount of drag during the play of the fish. The disadvantage of such a reel construction lies in the unfavorable drag-retrieve ratio.

The drag-retrieve ratio is best understood by appreciating that in a spinning reel, and particularly a closed face type spinning reel, the line makes several sharp turns as it passes from the spool over the rotatable flyer, is snubbed around the pickup device on the flyer, and passes through the line guide opening in the closed face of the reel. These sharp turns, or bends, in the line increase the amount of pull required to allow a fish to run against the drag mechanism located remotely of the flyer between the crank handle and the drive gear, yet permit the drag disadvantageously so slip by a correspondingly lesser amount of force applied by the fisherman to the crank. Hence, an unfavorable drag-retrieve ratio.

In the third common form of drag mechanism, the flyer is frictionally affixed to the drive shaft on which it is carried. The angler, by adjusting the degree of the frictional, or drag, force between the flyer and its drive shaft can establish the amount of resistance applied by the line to the flyer necessary to effect a slippage between the flyer and its drive shaft. By thus locating the drag directly between the flyer and its drive shaft, the friction applied to the line as it passes the several sharp turns, or bends, from the line guide in the cover to the spool does not adversely affect the pull required for the fish to run as compared to the amount of force required to be applied by the fisherman to the crank when retrieving the line. Thus, the drag-retrieve ratio is far more favorable.

However, the disadvantages of this third discussed location for the drag mechanism is that heretofore it has been required that the adjusting knob therefor be inaccessibly located. The generally established location for this knob is at the front of the flyer, often extending outwardly of the line guide opening in the closed face of the reel. Convenient though such a location may appear on paper, in practice this locates the adjusting knob interiorly of the cone developed by that portion of the line extending between the rotating flyer, or the guide opening in a closed face reel, and the first line guide on the fishing rod.

Such a location would not be as disadvantageous if the angler need only initially set the amount of drag. However, properly to play a fish may require repeatedly decreasing the amount of drag to let the fish run and alternately increasing the amount of drag to permit selective retrieval of the line. With the adjusting knob located at the forward end of the reel it is difficult to alter the amount of drag without entangling the hands of the fisherman in the line at a possibly inappropriate time.

It is therefore an object of the present invention to provide a mechanism for adjusting the drag in a spinning type fishing reel in which the drag has a favorable drag-retrieve ratio.

It is another object of the present invention to provide a mechanism by which the amount of drag in a reel, as above, can be adjusted without entangling the hands of the fisherman.

It is a further object of the present invention to provide a mechanism for adjusting the amount of drag in a closed face spinning reel, as above, which can be operated by an adjusting knob located in proximity to the crank.

It is a still further object of the present invention to provide a drag adjusting mechanism, as above, which is easy to manufacture and sturdy in operation.

These and other objects of the invention, as well as the advantages thereof over existing and prior art forms, will become apparent from the following specification and are accomplished by means hereinafter described and claimed.

One preferred embodiment is shown by way of example in the accompanying drawings and described in detail without attempting to show all of the various forms and modifications in which the invention might be embodied; the invention being measured by the appended claims and not by the details of the specification.

Figure 1:
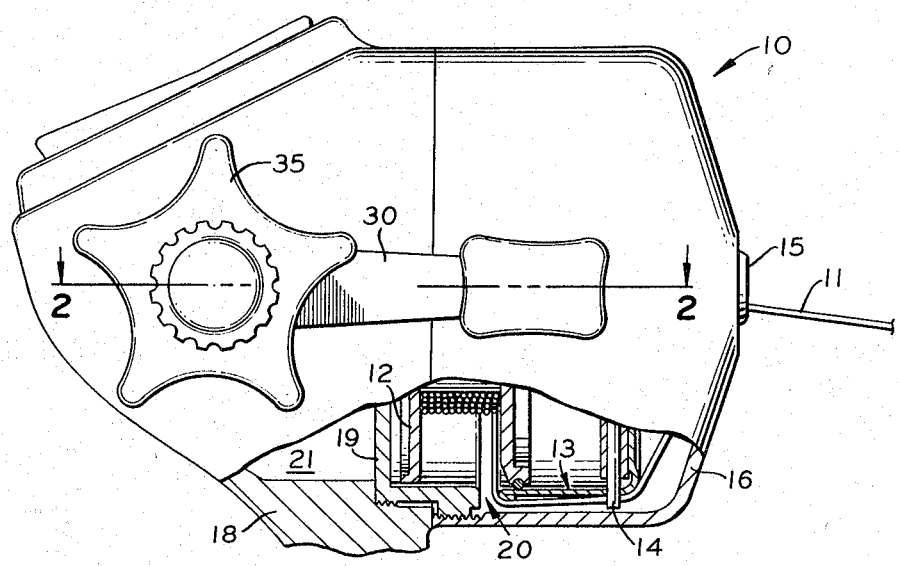
FIG. 1 is a side elevation, partly broken away, of a closed face spinning reel embodying the concept of the present invention.
Figure 3:
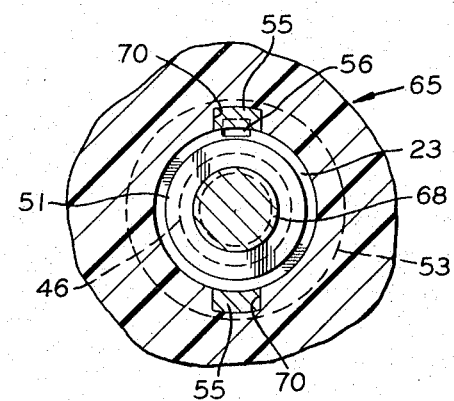
FIG. 3 is a fragmentary cross section taken substantially on line 3—3 of FIG. 2.

In general, a fishing reel embodying the concepts of the present invention has a fixed line spool carried within the housing. A flyer shaft is journaled for rotation in the housing and supports a flyer coaxially of and adjacent the forward, or line access, side of the spool. The flyer comprises a generally cup-shaped carrier with a line pickup mechanism. The flyer is attached to the flyer shaft by a friction drag means responsive to pressure applied thereagainst.

The pressure is applied to the drag means by an axially translatable head which is attached to a spindle by a connecting means so constructed and arranged that selective rotation of the spindle with respect to the head translates the head in the desired axial direction.

The flyer shaft may be rotated by manipulation of an operating crank, located exteriorly of the housing, connected to a drive shaft oriented transversely of the flyer shaft. The flyer shaft and drive shaft are, in turn, connected to each other by a standard pinion-face gear arrangement.

The drag adjusting knob, which may be located adjacent the crank, is fixed to a drag arbor coaxially positioned through the drive shaft for rotation with and with respect thereto. A similar gear means comprising a pinion and face gear arrangement rotates the spindle in response to rotation of the drag arbor, so that when the adjusting knob is turned with respect to the crank the spindle rotates with respect to the flyer shaft and the head which is mounted to rotate with, but not with respect to, the flyer shaft.

Referring more particularly to the drawings, a spinning reel incorporating the improved drag operating mechanism is indicated generally by the numeral 10. While the subject mechanism is readily adapted to most types of spinning reels, it is shown in conjunction with a closed face spinning reel since in such a reel the line 11 must make several sharp turns as it passes from the spool 12 over the rotatable flyer 13, around the pickup mechanism 14 on the flyer 13 and out the eyelet, or line guide opening 15 in the cap 16 which forms the closed face. Because of these sharp turns, the drag-retrieve ratio is especially favorable when the drag is located between the flyer and the shaft on which it is mounted, as discussed generally above and hereinafter more fully described.

The cap 16 is screwed, or otherwise attached, to the reel housing 18 which is preferably divided, by a partition wall 19, into a spool compartment 20 and a gear compartment 21. If greater details are desired relative to the general construction and operation of a closed face spinning reel, one can refer to my prior U.S. Patent No. 3,025,020, which issued on March 13, 1962.

Figure 2:
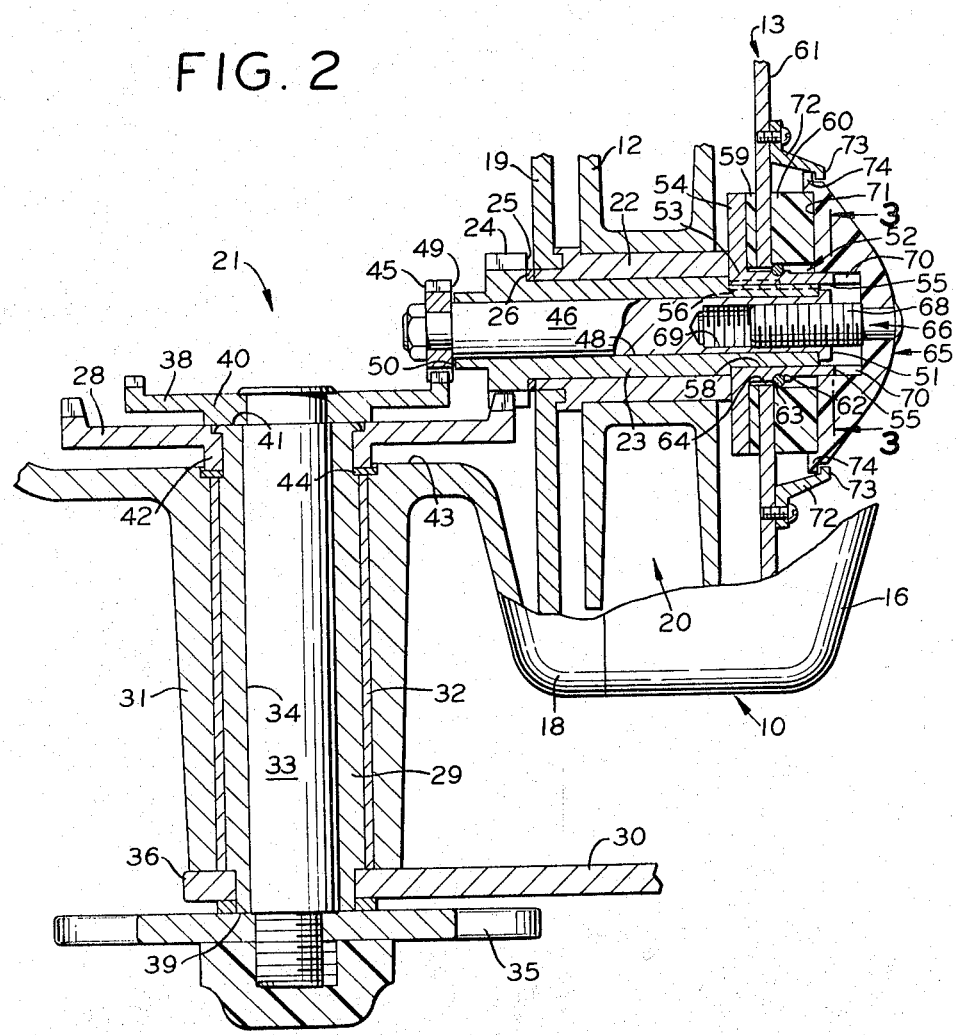
FIG. 2 is an enlarged cross section taken substantially on line 2—2 of FIG. 1.

As best shown in FIG. 2, a cylindrical sleeve bearing bushing 22 is fixed to, and extends forwardly from, the partition wall 19. Interiorly of bushing 22 a flyer shaft 23 is mounted for rotation. Exteriorly of the bushing 22 the spool 12 is supported. The rear portion of the flyer shaft 23 extends through the partition wall 19 into the gear compartment 21 and is attached to rotate with a pinion gear 24 mounted thereon. The flyer shaft can be secured against axially forward translation by engagement of the forward face 25 of the pinion gear 24 with the partition wall 19. Of course, a self lubricating disk washer 26 may be positioned therebetween to alleviate wear.

The pinion gear 24 meshes with a drive face gear 28 which is nonrotatably secured to the drive shaft 29. Undesirable axially rearward translation of the flyer shaft 23 may be prevented simply by utilizing a face gear 28 which is beveled, as is standard practice, or the forward end may be provided with a radially extending thrust flange to engage the forward end of the bushing 22.

The usual crank handle 30 is used selectively to rotate the drive shaft 29 which is nonrotatably connected to drive shaft 29 journaled in boss 31 formed in the housing of the reel. If desired, a sleeve bushing 32 may be interposed between the drive shaft 29 and its boss 31 to facilitate rotation.

A drag arbor 33 is positioned coaxially of the drive shaft 29 within the longitudinal bore 34 therethrough so as to be rotatable with and with respect to the drive shaft 29 in which it is received. A drag adjusting knob 35, which may be in the form of the standard star wheel, is nonrotatably secured to the outermost extremity of the drag arbor 33 so as to be readily accessible to the angler at the base, or hub, 36 of the crank handle 30.

At the opposite, or interior, end of the drag arbor 33, a drag face gear 38 is nonrotatably secured. The axial position of the drag arbor 33 may be maintained with respect to the drive shaft 29 by having the adjusting knob 35 rotatably engaging the axially outer face 39 of the drive shaft 29 and having the hub 40 of the drag face gear 38 rotatably engaging the axially inner face 41 of the drive shaft 29. Axially outward displacement of the drive shaft 29 may be prevented by rotational engagement of the hub 42 of face gear 28 with the inner surface 43 of the reel housing. Here too, a flat bushing 44 may be interposed to reduce wear by alleviating frictional contact. Axially inward translation is, of course, prevented by engagement of the face gear 28 with pinion 24.

The drag face gear 38 meshes with the pinion gear 45 nonrotatably keyed to the inner end—i.e., that end which extends into the gear compartment 21—of the drag spindle 46. The drag spindle 46 is positioned coaxially of the flyer shaft 23 within the longitudinal bore 48 therethrough so as to be rotatable with and with respect to the flyer shaft 23.

The forward face 49 of the drag pinion 45 engages the rearmost end 50 of the flyer shaft 23 to prevent axially forward movement of the drag spindle 46, and a flange 51 extends radially of the spindle 46, to engage the forward end of the flyer shaft 23 to prevent axially rearward movement of the spindle.

The end of the flyer shaft 23 forwardly of the bearing bushing 22 is reduced in outside diameter and carries a collar 52. The collar 52 has a cylindrical body portion 53 with a stop flange 54 extending radially outwardly from the rearmost portion thereof. A pair of guide pins 55 extend axially forwardly from the forward end of the body portion 53 for a purpose more fully hereinafter described.

A lug, or other key means, 56 extending radially inwardly of the cylindrical interior 58 of collar 52 engages the flyer shaft 23 to assure that the collar 52 will rotate therewith.

A pair of flat brake disks 59 and 60 are fitted over the cylindrical body portion 53 with the web 61 of the flyer 13 sandwiched therebetween and with the rearmost disk 59 positioned contiguous with the stop flange 54. An annular notch 62 in the cylindrical outer surface of the body portion 53 receives a retaining ring 63 to prevent the flyer 13 from inadvertently moving forwardly off the collar 52 on which it is supported. It is also imperative that the bore 64 through the web 61 be of such a diameter that the flyer 13 can rotate relative to the collar 52.

A pressure head 65 is supported by and carried on the drag spindle 46. The connection means, indicated generally by the numeral 66, by which the head 65 is attached to the spindle 46, such as the threaded connection depicted, provides that rotation of the spindle 46 in one direction with respect to the head 65 axially translates the head in one direction and reverse rotation of the spindle with respect to the head axially translates the head in the opposite direction. The threaded connection depicted comprises an axially oriented stub shaft 68 extending rearwardly from the head 65 and threadably received in an axial bore 69 in the forward portion of the spindle 46. The guide pins 55, extending forwardly from the body portion 53 of collar 52, are received in keyways 70 in the head 65 so that the head cannot rotate relative to the flyer shaft 23. Thus, rotation of the spindle 46 relative to the head 65 is also rotation of the spindle 46 relative to the flyer shaft 23. The relative rotation which results in axial translation of the head rearwardly, compresses the brake disks 59 and 60 and the sandwiched web 61 between the stop flange 54 and the radial work face 71 on the rearmost side of the head 65 to increase the drag. Similarly, reverse axial translation of the head 65 decreases the compressive force upon the brake disks 59 and 60 so that flyer 13 is permitted more freely to rotate with respect to the collar 52—hence, a reduction in the drag.

As shown, keepers 72 may also be provided on the web 61. The keepers 72 each have a lip 73 which extends over the edge shoulder 74 on the head 65 to prevent accidentally overtranslating the head forwardly from the collar 52 sufficiently to disengage the connecting means 66.

It should thus be apparent that in a reel embodying the concept of the present invention, the angler can, while holding the crank handle 30 against rotation, turn the adjusting knob 35 to rotate the drag arbor 33 with respect to the drive shaft 29. This relative movement is imparted to the spindle 46 and flyer shaft 23 through the corresponding relative rotation of the face gears 28 and 38 and the pinion gears 24 and 45 with which they are respectively meshed. Accordingly, a drag mechanism mounted between the flyer 13 and its shaft 23 so as to provide a spinning reel having a favorable drag-retrieve ratio, can be adjusted from a location remotely of the drag mechanism itself—to wit, in proximity to the hub 36 of crank 30. And, when the drag is adjusted to the satisfaction of the angler, he may freely rotate the crank handle 30 without affecting the drag adjustment. This is possible since the drag arbor 33 is rotatable with the drive shaft 29 when the adjusting knob 35 is not manipulated separately of the crank handle 30.

Accordingly, the applicant has accomplished the objects of the invention.

What is claimed is:

1. A drag adjusting mechanism for a spinning reel in which a pressure responsive drag mechanism connects the flyer and the rotatable shaft on which the flyer is carried comprising, a head axially movable to vary the pressure on said drag mechanism, a drag spindle rotatably mounted in said reel, connecting means between said head and said drag spindle to effect axial translation of said head in response to rotation of said drag spindle with respect to said head, an adjusting knob means remotely of the drag spindle, first gear means attached to and selectively rotatable by said adjusting knob, second gear means attached to said drag spindle for rotation therewith, said first and second gear means engaged so that said spindle rotates relative to said head on manipulation of said adjusting knob.

2. A drag adjusting mechanism, as set forth in claim 1, in which the axis of the first gear means is oriented perpendicularly to the axis of the second gear means.

3. In a spinning type fishing reel having a housing, a line spool mounted in said housing, a flyer shaft rotatably supported in said housing, a flyer carried on said flyer shaft, pressure responsive drag means connecting said flyer to said flyer shaft, a head, said head mounted for axial movement with respect to said flyer shaft, said head operatively connected to said drag mechanism so that axial movement of said head in one direction increases the drag between said flyer and its shaft and axial movement of said head in the other direction decreases the drag between said flyer and said flyer shaft, a spindle mounted for rotation in said housing, connecting means between said spindle and said head so that rotation of said spindle in one direction with respect to said head effects axial translation of said head in one direction and counter rotation of said spindle effects an axial translation of said head in another direction, an adjusting knob means remotely of said spindle, first gear means attached to and selectively rotatable by said adjusting knob, second gear means attached to said spindle for rotation therewith, said first and second gear means engaged so that said spindle is rotatable relative to said head on manipulation of said adjusting knob.

4. A spinning reel, as set forth in claim 3, in which the second gear means is a pinion, and the first gear means is a face drive gear, the axis of rotation of which is perpendicular to the rotational axis of said spindle.

5. In a spinning reel having a housing, a line spool mounted in said housing, a flyer shaft rotatably mounted in said housing, a flyer carried on said flyer shaft to be coaxial with said spool, friction drag means connecting said flyer to said flyer shaft, a spindle rotatably mounted coaxially of said flyer shaft, an axially translatable head, connecting means attaching said head to said spindle so that rotation of said spindle with respect to said head translates said head axially, actuating means on said head operably connected to said friction drag means so that axial translation of said head in one direction increases the drag between said flyer and said flyer shaft and axial translation in the reverse direction decreases the drag between said flyer and said flyer shaft, an adjusting knob means remotely of said drag means, first gear means attached to and selectively rotatable by said adjusting knob means, second gear means attached to said drag spindle for rotation therewith, said first and second gear means engaged so that said spindle is rotatable relative to said head on manipulation of said adjusting knob means.

6. A spinning reel, as set forth in claim 5, which has a drive shaft rotatably mounted in said housing, a crank fixed to said drive shaft exteriorly of said housing for rotation therewith, third gear means connecting said drive shaft to said flyer shaft so that rotation of said crank rotates said flyer shaft, said adjusting knob means including a drag arbor mounted coaxially of said drive shaft for rotation with and with respect thereto, and an adjusting knob fixed on said drag arbor exteriorly of said housing for rotation therewith, said first and second gear means connecting said drag spindle with said drag arbor so that selective rotation of said adjusting knob independently of said crank rotates said spindle independently of said head.

7. In a spinning reel having a housing, a line spool mounted in said housing, a flyer shaft rotatably mounted in said housing, a flyer having a web and carried on said flyer shaft by said web, a stop flange extending radially outwardly of said flyer shaft substantially parallel to at least a portion of said web, a bore axially through said flyer shaft, a drag spindle mounted in said bore for rotation with and with respect to said flyer shaft, a pressure head, said pressure head located on the opposite side of said web from said stop flange, a radially oriented actuating face on said pressure head facing at least a portion of said web, friction disks disposed between said stop flange, web and actuating face, connecting means joining said drag spindle to said pressure head so that rotation of said spindle with respect to said pressure head axially translates said pressure head with respect to said stop flange, key means between said spressure head and said flyer shaft, an adjusting knob means remotely of said drag means, first gear means attached to and selectively rotatable by said adjusting knob means, second gear means attached to said drag spindle for rotation therewith, said first and second gear means engaged so that said spindle is rotatable relative to said head on manipulation of said adjusting knob.

8. A spinning reel, as set forth in claim 7, in which a drive shaft is rotatably mounted in said housing, a crank fixed to said drive shaft exteriorly of said housing for rotation therewith, third gear means connecting said drive shaft to said flyer shaft so that rotation of said crank rotates said flyer shaft, said adjusting knob means including a drag arbor mounted coaxially of said drive shaft for rotation with and with respect thereto, and an adjusting knob fixed on said drag arbor exteriorly of said housing for rotation therewith, said first and second gear means connecting said drag spindle with said drag arbor so that selective rotation of said adjusting knob independently of said crank rotates said spindle independently of said head.

References Cited by the Examiner

UNITED STATES PATENTS

| | | | |
|---|---|---|---|
| 2,711,292 | 6/1955 | Taggart et al. | 242—84.21 |
| 2,974,895 | 3/1961 | Wood | 242—84.21 |
| 3,105,650 | 10/1963 | Kuether | 242—84.21 |
| 3,119,573 | 1/1964 | Brulhart | 242—84.21 |

FOREIGN PATENTS

| | | |
|---|---|---|
| 1,262,664 | 4/1961 | France. |

FRANK J. COHEN, *Primary Examiner.*

BILLY S. TAYLOR, *Examiner.*